US011559781B2

(12) United States Patent
Sanchez et al.

(10) Patent No.: US 11,559,781 B2
(45) Date of Patent: Jan. 24, 2023

(54) PROCESS FOR MANUFACTURING A MATERIAL WITH A HIGH SPECIFIC SURFACE AREA

(71) Applicants: SARP INDUSTRIES, Limay (FR); COLLEGE DE FRANCE, Paris (FR)

(72) Inventors: Clément Sanchez, Bures-sur-Yvette (FR); Cédric Boissiere, Villebon sur Yvette (FR); Lionel Nicole, Brunoy (FR); Hiva Baradari, Paris (FR); Xavier Chaucherie, Versailles (FR); Bruno Gilardin, Verneuil sur Avre (FR)

(73) Assignees: SARP INDUSTRIES, Limay (FR); COLLEGE DE FRANCE, Paris (FR)

( * ) Notice: Subject to any disclaimer, the term of this patent is extended or adjusted under 35 U.S.C. 154(b) by 384 days.

(21) Appl. No.: 16/492,885

(22) PCT Filed: Mar. 9, 2018

(86) PCT No.: PCT/FR2018/050546
§ 371 (c)(1),
(2) Date: Sep. 10, 2019

(87) PCT Pub. No.: WO2018/162861
PCT Pub. Date: Sep. 13, 2018

(65) Prior Publication Data
US 2020/0070122 A1 Mar. 5, 2020

(30) Foreign Application Priority Data
Mar. 10, 2017 (FR) ...................................... 17 51993

(51) Int. Cl.
*B01J 20/02* (2006.01)
*B01J 20/28* (2006.01)
*B01J 20/30* (2006.01)

(52) U.S. Cl.
CPC ......... *B01J 20/02* (2013.01); *B01J 20/28004* (2013.01); *B01J 20/28016* (2013.01); *B01J 20/28061* (2013.01); *B01J 20/28064* (2013.01); *B01J 20/28083* (2013.01); *B01J 20/3064* (2013.01); *B01J 20/3071* (2013.01); *B01J 20/3078* (2013.01)

(58) Field of Classification Search
CPC ................. B01J 20/02; B01J 20/28004; B01J 20/28016; B01J 20/28061; B01J 20/28064; B01J 20/28083; B01J 20/3064; B01J 20/3071; B01J 20/3078
USPC ........................................................ 502/439
See application file for complete search history.

(56) References Cited

U.S. PATENT DOCUMENTS

| 4,113,832 A | * | 9/1978 | Bell .......................... C25C 3/08 |
| | | | 423/119 |
| 6,284,207 B1 | | 9/2001 | McCauley |
| 2015/0139871 A1 | | 5/2015 | Joshi et al. |
| 2017/0036157 A1 | * | 2/2017 | Riess ...................... C04B 7/365 |

FOREIGN PATENT DOCUMENTS

| CN | 102951687 A | 3/2013 |
| CN | 102320615 B | 11/2015 |
| CN | 103663511 B | 11/2015 |
| JP | H05172318 A | 7/1993 |
| JP | 2011202193 A | 10/2011 |
| WO | 2011074948 A1 | 6/2011 |

OTHER PUBLICATIONS

International Search Report with English translation and Written Opinion dated May 23, 2018 in corresponding International Application No. PCT/FR2018/050546; 16 pages.
Office Action dated Apr. 13, 2022, in connection with corresponding Chinese Application No. 201880026439.8 (13 pp., including machine-generated English translation).
Liu., "Summary of Mesoporous Materials", Synthesis and Application of Mesoporous Carbon Materials; Jun. 2012, 1st Edition, 1st Print; 7 pages with English Translation.

* cited by examiner

*Primary Examiner* — Edward M Johnson
(74) *Attorney, Agent, or Firm* — Maier & Maier, PLLC

(57) ABSTRACT

A manufacturing process that includes spray-drying a liquid composition based on liquid residues derived from a chemical extraction of clinker to form a material with a high specific surface area. Also, a material based on clinker residues having a high specific surface area ranging from 200 $m^2.g^{-1}$ to 900 $m^2.g^{-1}$ and a mesopore size ranging from 2 nm to 50 nm. Further, the use of a material having a high specific surface area for the absorption of pollutants species.

13 Claims, No Drawings

PROCESS FOR MANUFACTURING A MATERIAL WITH A HIGH SPECIFIC SURFACE AREA

FIELD

The invention relates to a process for manufacturing a material with a high specific surface area, for upgrading clinker, to a material with a high specific surface area and also to the use thereof.

BACKGROUND

At the present time in France, incineration is the second most common method for disposing of household waste. Treatment of waste by incineration is a process applied not only to household waste but also to industrial waste.

The incineration process gives rise to a reduction in the volume and mass of solid waste, but this reduction is merely apparent. Specifically, incineration generates fumes (5000 m$^3$ per tonne of burnt waste), solid residues and liquid effluents (treatment of the fumes, quenching of the clinker, etc.).

The solid slag collected at the bottom of incinerator furnaces after waste combustion is known as household waste incineration clinker (HWIC) and/or industrial waste incineration clinker (IWIC). It is composed of ash (in the form of granules), various incombustible materials (mixture of ferrous and non-ferrous metals, glasses, silica, alumina, limestone, lime, etc.), unburnt materials and water. Since each tonne of incinerated waste produces 250 kg to 300 kg of clinker, this represents for France alone an annual production of about 3 million tonnes of clinker.

Due to certain physical characteristics of clinker, notably its good load-bearing capacity, a large proportion has been upgraded in road engineering, notably in substitution for natural aggregates. In France, for example, more than 2 million tonnes of clinker are applied essentially as road sub-layer. However, due to the presence of pollutant elements such as heavy metals and dioxins, the composition of clinker is environmentally problematic.

Indeed, water originating from the trickling of rainwater or from percolation may lead to the dispersion of the pollutants and thus contaminate the surrounding soils and water tables.

In order to limit the environmental impact of clinker, it is necessary to determine its leaching rate and also the leaching rate of materials containing same. To this end, the decree of Nov. 18, 2011, relating to the road-engineering recycling of nonhazardous waste incineration clinker introduced additional constraints, for instance the increase in the number of substances to be taken into account, the lowering of the majority of the pollutant thresholds or the reinforcement of the traceability of these substances. These restrictions thus limit the upgrading of clinker in the road engineering sector, thus leading to an increase in storage at the refuse dump.

Another way for upgrading clinker concerning dry ground clinker is based on the process of chemical extraction and notably of upgradeable elements such as silicon, calcium, iron and aluminum.

This upgrading may be envisioned along two axes, the upgrading of $SiO_2$ in the glass industry and/or in the $SiO_2$ production industries, on the one hand, and the upgrading of the elements Ca, Fe and Al in the metallurgical industry, on the other hand.

Although the solid residues from solid/liquid extraction tests form potentially upgradeable solid precursors, the liquid residues, i.e. washing leachates, containing upgradeable elements, must be processed (e.g. neutralization) in order to be able to be upgraded.

After considerable research, the Applicant has, to its merit, developed a novel process for manufacturing material with a high specific surface area from liquid residues derived from the chemical extraction of clinker, thus making it possible to propose novel routes for the upgrading of said liquid residues.

SUMMARY

A first subject of the invention relates to a process for manufacturing a material with a high specific surface area, comprising a step of spraying of a liquid composition based on liquid residues derived from a chemical extraction of clinker.

A second subject of the invention relates to a material with a high specific surface area, having a specific surface area of from 200 m$^2 \cdot$g$^{-1}$ to 900 m$^2 \cdot$g$^{-1}$ and also a mesopore size of from 2 nm to 50 nm and a micropore volume of between 0 and 0.2 cm$^3 \cdot$g$^{-1}$.

Finally, a third subject of the invention relates to the use of a material with a high specific surface area, as obtained according to the process of the invention or as defined previously, as an adsorption support for pollutant species.

DETAILED DESCRIPTION

A first subject of the invention relates to a process for manufacturing a material with a high specific surface area, comprising a step of spraying of a liquid composition based on liquid residues derived from a chemical extraction of clinker.

For the purposes of the present invention, the term "clinker" is used to denote both incineration clinker of industrial origin (IWIC) and household waste incineration clinker (HWIC), except when the context makes it possible to identify that it is specifically one or the other. The clinker may be processed so as to obtain a metal-enriched aqueous leachate.

For the purposes of the present invention, the term "leachate" also means "liquid residues" or "washing leachate" and may correspond to the residual liquid which originates from the percolation of water through clinker.

The spraying step consists in producing from a liquid spherical solid particles by passing said liquid through a spraying nozzle. Said spraying nozzle may be a "one-fluid", "two-fluid" or "three-fluid" nozzle according to the terms known to those skilled in the art. Said spraying nozzle also has a control for the pressure of a gas, for instance compressed air or nitrogen, and may function by the Venturi effect, by the piezoelectric effect or by the centrifugal effect. The size distribution of the droplets obtained is generally of lognormal type.

According to the invention, the step of spraying, also known as spray-drying, of a liquid composition based on liquid residues derived from a chemical extraction of clinker may take place in a chamber into which is sent a heated carrier gas. The heated carrier gas may be a nonexplosive gas, and generally for industrial-scale installations, the carrier gas may be compressed air, nitrogen or an air/nitrogen mixture. When the droplets are produced, they are dried by contact with the heated gas described above, which leads to the gradual evaporation of the solvent, which is predominantly water, to the evaporation of the volatile species and also to co-assembly of the nonvolatile species contained in the liquid residues derived from a chemical extraction of clinker.

The outlet temperature ensuring drying in the spraying chamber may be within a range extending from 50° C. to 800° C. It should also be noted that the residence time distribution of the droplets or particles in the spraying chamber is of the order of a few seconds. Thus, each droplet of said liquid composition makes it possible to obtain a spherical elementary particle.

As a function of the installation, the non-aggregated spherical elementary particles ranging in size from 0.3 to 100 μm are recovered at the outlet of a vortex or in a bag filter. Preferably, said particles are recovered at the outlet of a vortex.

Spraying has many advantages. It may be performed continuously, which represents a saving in time relative to a sequential method. Next, it is a relatively inexpensive method which can be readily implemented at the industrial scale, and is thus perfectly suited to the large-scale spraying of a liquid composition based on liquid residues derived from a chemical extraction of clinker. Finally, the environmental impact is lesser since it does not generate any waste other than solvent vapors, said vapors being, according to the process of the invention, generally water vapors.

According to a particular embodiment, the process of the invention described previously comprises a preliminary step of preparing said liquid composition.

The step of preparing a liquid composition consists in mixing liquid residues derived from a chemical extraction of clinker with a structuring agent, optionally a crosslinking agent, and optionally water.

It should be noted that, in the present patent application, conventionally, the indefinite article "a" should be considered as a generic plural (meaning "at least one" or "one or more"), unless the context shows the contrary (1 or "only one"). Thus, for example, when it is mentioned above that the preparation of a liquid composition consists in mixing liquid residues derived from a chemical extraction of clinker with a structuring agent, it should be understood that liquid residues derived from a chemical extraction of clinker are mixed with one or more structuring agents.

According to a particular embodiment, the liquid residues derived from a chemical extraction of clinker are obtained by solid/liquid extraction of clinker.

Specifically, the solid/liquid extraction consists in placing the clinker in contact with a liquid, thus giving rise to the dissolution of a portion of the constituents of said clinker. The solid/liquid extraction makes it possible to perform sorting of the chemical components of the clinker and to generate, on the one hand, the liquid residues, said liquid residues being rich in metals, and, on the other hand, a solid phase that is very poor in metals. In the context of the process of the invention, only the liquid residues derived from the extraction of clinker are used for the manufacture of a material with a high specific surface area; the solid phase may be upgraded in other fields, in particular in road engineering.

The conditions of this liquid/solid extraction are determined by a person skilled in the art as a function of physical factors, for instance the size and shape of the particles, the homogeneity of the material, the exposure time, the stream of the leaching agent (liquid/solid ratio and force or speed of stirring in the case of leaching), the temperature, the extraction time. The conditions may also be determined as a function of chemical factors: the establishment of a solubility equilibrium in which participate the dissolution kinetic control, the leaching potential of the constituents, the pH imposed by the material and/or the external environment, the redox conditions, the sorption, re-precipitation and passivation processes.

The solid/liquid extraction of the clinker is advantageously performed with an acidic and/or oxidizing solution. The acidic and/or oxidizing solution used for the solid/liquid extraction is chosen from the group comprising a hydrochloric acid (HCl), sulfuric acid ($H_2SO_4$), hydrofluoric acid (HF), sodium oxide ($Na_2O$) or potassium oxide $K_2O$) solution, and mixtures thereof. Preferentially, the solution employed for the solid/liquid extraction is a hydrochloric acid (HCl) solution, and preferentially a 30% to 40% and notably about 37% concentrated hydrochloric acid (HCl) solution.

According to a particular embodiment, said liquid composition based on liquid residues derived from a chemical extraction of clinker is obtained by mixing the liquid residues as obtained above with a structuring agent.

The presence of a structuring agent in said liquid composition is particularly advantageous since it makes it possible, firstly, to structure the particles at the nanometric scale, and, secondly, during its subsequent removal, to generate porosity in the particles obtained, so as to create nanometer-sized pores, in other words to obtain a mesostructured material. A mesostructured material is a material comprising mesopores having a size ranging from 2 nm to 50 nm, preferably from 2 nm to 30 nm and more preferably from 2 nm to 10 nm.

The structuring agent may be chosen from the group comprising surfactants, water-soluble polymers (for example: polyethylene glycol (PEG), poly(vinyl alcohol) (PVAL), polyacrylamide or polyvinylpyrrolidone), cellulose-based compounds (for example: cellulose ether), mineral salts (for example: NaCl or $CaCl_2$), biological polymers (for example casein), and also mixtures thereof.

When the structuring agent is a surfactant, it may be ionic or nonionic. According to a particular embodiment, the structuring agent is a nonionic surfactant and it may be chosen from the group comprising alkanolamides, oligopeptides, sugar derivatives, polyethylene derivatives such as polyethylene glycol hexadecyl ether (Brij® 58), and mixtures thereof.

The nonionic surfactant may also be a copolymer bearing at least two parts of different polarities, giving them amphiphilic macromolecule properties. These copolymers may include at least one block featured within the following nonexhaustive list of families of polymers: fluoro polymers (for example —[$CH_2$—$CH_2$—$CH_2$—$CH_2$—O—CO—R1]- with R1=$C_4F_9$, $C_8F_{17}$, etc.), biological polymers, for instance polyamino acids (polylysine, alginates, etc.), dendrimers, or polymers constituted of poly(alkylene oxide) chains.

In general, copolymers of amphiphilic nature known to those skilled in the art may be used as surfactant, for instance those described in the following publications: S. Förster, M. Antionnetti, *Adv. Mater,* 1998, 10, 195-217; S. Förster, T. Plantenberg, *Angew. Chem. Int. Ed,* 2002, 41, 688-714; H. Cölfen, *Macromol. Rapid Commun,* 2001, 22, 219-252.

In the case of an amphiphilic copolymer as surfactant, use may be made of an amphiphilic copolymer of which at least one block is constituted of poly(alkylene oxide) chains. Said block copolymer is preferably a block copolymer containing two, three or four blocks, each block being constituted of a poly(alkylene oxide) chain.

For a copolymer containing two blocks, one of the blocks is constituted of a poly(alkylene oxide) chain of hydrophilic nature and the other block is constituted of a poly(alkylene oxide) chain of hydrophobic nature.

For a copolymer containing three blocks, at least one of the blocks is constituted of a poly(alkylene oxide) chain of hydrophilic nature whereas at least one of the other blocks is constituted of a poly(alkylene oxide) chain of hydrophobic nature. Preferably, in the case of a copolymer containing three blocks, the poly(alkylene oxide) chains of hydrophilic nature are poly(ethylene oxide) chains denoted $(PEO)_x$ and $(PEO)_z$ and the poly(alkylene oxide) chains of hydrophobic nature are poly(propylene oxide) chains denoted $(PPO)_y$, poly(butylene oxide) chains, or mixed chains in which each chain is a mixture of several alkylene oxide monomers. Very preferably, in the case of a copolymer containing three blocks, use is made of a compound of formula $(PEO)_x$—$(PPO)_y$—$(PEO)_z$ in which x is between 5 and 300 and y is between 33 and 300 and z is between 5 and 300. Preferably, the values of x and z are identical. Very advantageously, use is made of a compound in which x=20, y=70 and z=20 (Pluronic® P123) and a compound in which x=106, y=70 and z=106 (Pluronic® F127). The commercial nonionic surfactants known under the name Pluronic® (BASF), for instance Pluronic® F127 or P123, Tetronic® (BASF), Triton® (Sigma), Tergitol® (Union Carbide), Brij® (Sigma-Aldrich), for instance Brij® 58, may be used as nonionic surfactants.

The anionic surfactants preferably used in the process according to the present invention may be anionic amphiphilic molecules such as sulfates, for instance $C_pH_{2p+1}OSO_3Na$ with p=12, 14, 16 or 18, or sulfonates, for instance $C_{16}H_{33}SO_3H$ and $C_{12}H_{25}C_6H_4SO_3Na$.

According to a particular embodiment, the structuring agent is an ionic surfactant, for instance a cationic amphiphilic surfactant. As examples of cationic amphiphilic surfactants, mention may be made notably of imidazolium, pyridinium or phosphonium salts, but also quaternary ammonium salts such as those of formula (I) below.

Thus, particular quaternary ammonium salts may notably be chosen from those corresponding to the general formula (I) below:

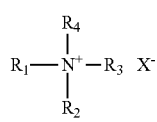

(I)

in which the radicals $R_1$ to $R_4$, which may be identical or different, represent a linear or branched alkyl group, including from 1 to 30 carbon atoms, and X represents a halogen atom such as a chlorine or bromine atom, or a sulfate.

Among the quaternary ammonium salts of formula (I), mention may be made notably of tetraalkylammonium halides, for instance dialkyldimethylammonium or alkyltrimethylammonium halides in which the alkyl radical includes from about 12 to 22 carbon atoms, in particular behenyltrimethylammonium, distearyldimethylammonium, cetyltrimethylammonium or benzyldimethylstearylammonium halides. Preferably, the halides are bromides.

Preferentially, the structuring agent used as a mixture with the liquid residues derived from a chemical extraction of clinker according to the preparation step described previously is polyethylene glycol hexadecyl ether, cetyltrimethylammonium bromide (CTAB), Pluronic® F127, Pluronic® P123 or any mixture of these surfactants.

According to a particular embodiment, the composition based on liquid residues derived from the chemical extraction of clinker may also comprise at least one precursor of an inorganic or hybrid organic/inorganic matrix. Thus, the composition may comprise at least one inorganic precursor and/or at least one hybrid organic/inorganic precursor. The term "inorganic precursor" means a precursor which gives rise, in a sol/gel reaction, to the creation of an inorganic matrix. Similarly, the term "hybrid organic/inorganic precursor" means a precursor which gives rise, in a sol/gel reaction, to the creation of a hybrid organic/inorganic matrix.

The precursor makes it possible to contribute toward the creation of an inorganic or hybrid organic/inorganic matrix and to overcome the intrinsic chemical variability associated with the liquid residues derived from the chemical extraction of clinker. Specifically, as there is chemical variability between HWICs and IWICs and even between HWICs or IWICs not coming from the same incineration center, there is, consequently, also chemical variability between the liquid residues derived from the chemical extraction of these same clinkers.

According to a particular embodiment, the precursor is an inorganic precursor, notably a silicic or aluminous precursor, preferentially a silicic precursor. When the precursor is silicic, it is advantageously chosen from the group comprising silicic acid, silicon alkoxides, silicate, colloidal silica, methyltriethoxysilane (MTEOS), phenyltriethoxysilane (PTEOS), tetraethyl orthosilicate (TEOS), aminopropyltriethoxysilane (APTES), silicon tetrachloride $SiCl_4$, and mixtures thereof. Preferentially, the precursor is tetraethyl orthosilicate (TEOS), $SiCl_4$, methyltriethoxysilane (MTEOS) or mixtures thereof.

The mole ratio between the structuring agent and the precursor makes it possible notably to condition the pore volume of the final particle, the connectivity of the pore network and the size distribution of the pores produced. Thus, the molar amounts of the precursors added to said composition may be adjusted so as to obtain in the dry product, after a spray-drying step, a volume percentage of structuring agent of between 10% and 90% of the total volume, preferably between 25% and 75%. In other words, the amounts of precursors are added so that the material with a high specific surface area obtained after a spray-drying step has a volume percentage of structuring agent of between 10% and 90% of the total volume, preferably between 25% and 75%. The mole ratio between the structuring agent and the precursor(s) may be from 0.002 to 0.5, preferably from 0.02 to 0.4, more preferably from 0.02 to 0.3 and most particularly from 0.02 to 0.2.

According to a particular embodiment, when the structuring agent is a surfactant of the Brij family, for instance Brij® 58, and the precursor is $SiCl_4$, the Brij® 58/$SiCl_4$ mole ratio is between 0.03 and 0.2.

According to a particular embodiment, when the structuring agent is a nonionic surfactant such as Pluronic® F127 and the precursor is $SiCl_4$, the nonionic surfactant/$SiCl_4$ mole ratio is between 0.002 and 0.02.

According to a particular embodiment, when the structuring agent is a quaternary ammonium salt such as cetyltrimethylammonium bromide (CTAB) and the precursor is $SiCl_4$, the quaternary ammonium salt/$SiCl_4$ mole ratio is between 0.08 and 0.4.

According to another particular embodiment, at least one hybrid organic-inorganic precursor may be added to said inorganic precursor in an amount of between 1 mol % and 50 mol % and preferentially between 5 mol % and 30 mol % of the precursors introduced. Said hybrid precursor(s) including one or more hydrolysable groups may be of metal alkoxide or halide type, preferably metal alkoxide, of formula (II) or (III) below:

in which:

x is an integer ranging from 1 to 3;

Z represents, independently of each other, a halogen atom or a group —OR, and preferably a group —OR;

R represents an alkyl group preferably comprising 1 to 4 carbon atoms, such as a methyl, ethyl, n-propyl, i-propyl, n-butyl, s-butyl or t-butyl group, preferably methyl, ethyl or i-propyl, and more preferably ethyl;

R' represents, independently of each other, a proton or a non-hydrolyzable group chosen from alkyl groups, notably of C1-4, for example methyl, ethyl, propyl or butyl; alkenyl groups, in particular of C2-4, such as vinyl, 1-propenyl, 2-propenyl and butenyl; alkynyl groups, in particular of C2-4, such as acetylenyl and propargyl; aryl groups, in particular of C6-10, such as phenyl and naphthyl; methacryl or methacryloxy(C1-10 alkyl) groups such as methacryloxypropyl; epoxyalkyl or epoxyalkoxyalkyl groups in which the alkyl group is linear, branched or cyclic, of C1-10, and the alkoxy group includes from 1 to 10 carbon atoms, such as glycidyl and glycidyloxy(C1-10 alkyl); C2-10 haloalkyl groups such as 3-chloropropyl; C2-10 perhaloalkyl groups such as perfluoropropyl; C2-10 mercaptoalkyl groups such as mercaptopropyl; C2-10 aminoalkyl groups such as 3-aminopropyl; (C2-10 aminoalkyl)amino(C2-10 alkyl) groups such as 3-[(2-aminoethyl)amino]propyl; di(C2-10 alkylene) triamino(C2-10 alkyl) groups such as 3-[diethylenetriamino] propyl and imidazolyl(C2-10 alkyl) groups;

R" represents a non-hydrolyzable function chosen from alkylene groups, preferably of C1-12, for example methylene, ethylene, propylene, butylene, hexylene, octylene, decylene and dodecylene; alkynylene groups, preferably of C2-12, for example acetylenylene (—C≡C—), —C≡C—C≡C—, and —C≡C—$C_6H_4$—C≡C—; N,N-di(C2-10 alkylene)amino groups such as N,N-diethyleneamino; bis[N,N-di (C2-10 alkylene)amino] groups such as bis[N-(3-propylene)-N-methyleneamino]; C2-10 mercaptoalkylene such as mercaptopropylene; (C2-10 alkylene)polysulfide groups such as propylene-disulfide or propylene-tetrasulfide; alkenylene groups, in particular of C2-4, such as vinylene; arylene groups, in particular of C6-10, such as phenylene; C6-10 di(C2-10 alkylene)arylene groups, such as di(ethylene)phenylene; N,N'-di(C2-10 alkylene)ureido groups such as N,N'-dipropyleneureido.

As examples of organoalkoxysilanes of formula (II), mention may be made notably of 3-aminopropyltrialkoxysilane $(RO)_3Si$—$(CH_2)_3$—$NH_2$, 3-(2-aminoethyl)aminopropyltrialkoxysilane $(RO)_3Si$—$(CH_2)_3$—$NH$—$(CH_2)_2$—$NH_2$, 3-(trialkoxysilyl)propyldiethylenetriamine $(RO)_3Si$—$(CH_2)_3$—$NH$—$(CH_2)_2$—$NH$—$(CH_2)_2$—$NH_2$; 3-chloropropyltrialkoxysilane $(RO)_3Si$—$(CH_2)_3Cl$, 3-mercaptopropyltrialkoxysilane $(RO)_3Si$—$(CH_2)_3SH$; organosilyl azoles of N-(3-trialkoxysilylpropyl)-4,5-dihydroimidazole type, R having the same meaning as above.

As examples of bis-alkoxysilanes of formula (III), use is preferably made of a bis[trialkoxysilyl]methane $(RO)_3Si$—$CH_2$—$Si(OR)_3$, a bis[trialkoxysilyl]ethane $(RO)_3Si$—$(CH_2)_2$—$Si(OR)_3$, a bis[trialkoxysilyl]octane $(RO)_3Si$—$(CH2)_8$-$Si(OR)_3$, a bis[trialkoxysilylpropyl]amine $(RO)_3Si$—$(CH_2)_3$—$NH$—$(CH_2)_3$—$Si(OR)_3$, a bis[trialkoxysilylpropyl]ethylenediamine $(RO)_3Si$—$(CH_2)_3$—$NH$—$(CH_2)_2$—$NH$—$(CH_2)_3$—$Si(OR)_3$; a bis[trialkoxysilylpropyl]disulfide $(RO)_3Si$—$(CH_2)_3$—$S_2$—$(CH_2)_3$—$Si(OR)_3$, a bis[trialkoxysilylpropyl]tetrasulfide $(RO)_3Si$—$(CH_2)_3$—$S_4$—$(CH_2)_3$—$Si(OR)_3$, a bis[trialkoxysilylpropyl]urea $(RO)_3Si$—$(CH_2)_3$—$NH$—$CO$—$NH$—$(CH_2)_3$—$Si(OR)_3$; a bis[trialkoxysilylethyl]phenyl $(RO)_3Si$—$(CH_2)_2$—$C_6H_4$—$(CH_2)_2$—$Si(OR)_3$, R having the same meaning as above.

According to a particular embodiment, the composition based on liquid residues derived from the chemical extraction of clinker comprises at least one hybrid organic/inorganic precursor as described above.

According to a particular embodiment, the spray-drying step is performed by means of a three-fluid nozzle. According to this embodiment, the liquid composition based on liquid residues derived from a chemical extraction of clinker obtained by mixing the liquid residues as obtained above with a structuring agent may constitute a first fluid, whereas a second fluid may be constituted by a solution comprising the precursor. Furthermore, the "three-fluid" spraying nozzle may also allow the mixing of the liquid residues derived from a chemical extraction of clinker with the structuring agent at the time of spraying.

According to a particular embodiment, the process for manufacturing a material with a high specific surface area comprises, after said spray-drying step, a step of removing the structuring agent.

This step will make it possible to remove the structuring agent present in the particles, to create porosity and to mechanically reinforce the surrounding inorganic network.

According to the invention, the removal of the structuring agent may be performed by a heat treatment step or by a chemical treatment step, and, preferentially, the removal of the structuring agent is performed by heat treatment.

Advantageously, the heat treatment step is a calcination step. The calcination consists in heating at a temperature from 200° C. to 800° C., preferably at a temperature from 250° C. to 550° C., for a time of from 1 hour to 3 hours and preferably for a time of about 2 hours.

Calcination has the advantage, in addition to allowing the removal of the structuring agent, of transforming the metals present in the spherical solid particles into metal oxide, for instance the transformation of the iron into hematite ($Fe_2O_3$).

According to another particular embodiment, the process for manufacturing a material with a high specific surface area comprises, instead of the calcination step, a chemical treatment step, namely a chemical extraction. Specifically, the structuring agent may also be removed by chemical extraction. Depending on the nature of the structuring agent used, a person skilled in the art will know how to choose the extraction solvent. For example, the extraction may be performed with ethanol or with an aqueous-alcoholic mixture containing at least 10% by volume of ethanol.

According to a particular embodiment, the manufacturing process according to the invention may also comprise, after said step of removing the structuring agent, a washing and drying step.

This last step makes it possible to remove any soluble salts, for example the salts NaCl or $CaCl_2$ (salts concentrated during formation of the particles during the spray-drying phase), thus making it possible to increase the final specific surface area. The washing step is advantageously performed with water.

Advantageously, the manufacturing process according to the invention makes it possible to obtain a material with a high specific surface area, for which the mass fraction of solids derived from the clinker leachates in the final material is between 10% and 80% and preferably between 20% and 65%.

The term "high specific surface area" means that the material manufactured according to the process of the invention has a BET specific surface area of at least 200 $m^2 \cdot g^{-1}$ and preferably a specific surface area of at least 200 $m^2 \cdot g^{-1}$ and of not more than 900 $m^2 \cdot g^{-1}$.

The process according to the invention is thus particularly advantageous since it makes it possible to propose a novel route for upgrading clinker and most particularly a novel route for upgrading liquid residues derived from a chemical extraction. Thus, the process according to the invention makes it possible, from said liquid residues, to obtain a material with a high specific surface area.

In a second subject, the invention relates to a material based on clinker residues, said material being characterized by a high specific surface area ranging from 200 $m^2 \cdot g^{-1}$ to 900 $m^2 \cdot g^{-1}$ and also by a mesopore size ranging from 2 nm to 50 nm.

The materials with a high specific surface area according to the invention are said to be mesostructured and may be obtained via the process described previously. They may be defined by a specific surface area of from 200 $m^2 \cdot g^{-1}$ to 900 $m^2 \cdot g^{-1}$ determined notably by volumetric analysis with nitrogen. Depending on the type of structuring agents used and the synthetic conditions (temperature during the spray-drying step), the particles may also have a microporosity whose volume is between 0 and 0.2 $cm^3 \cdot g^{-1}$.

Indeed, the volumetric analysis with nitrogen corresponding to the physical adsorption of nitrogen molecules in the porosity of the material via gradual increase of the pressure at constant temperature gives information regarding the particular textural characteristics of the material according to the invention (pore diameter, type of porosity, specific surface area, pore volume, pore size distribution). In particular, it affords access to the specific surface area and to the mesopore distribution of the material.

The term "specific surface area" means the BET specific surface area (SBET in $m^2 \cdot g^{-1}$) determined by nitrogen adsorption in accordance with the standard ASTM D 3663-78 established from the Brunauer-Emmett-Teller method described in the journal "The Journal of American Society", 1938, 60, 309. The pore distribution representative of a population of mesopores centered in a range from 1.5 to 50 nm is determined by the Barrett-Joyner-Halenda model (BJI-1). The nitrogen adsorption-desorption isotherm according to the BJH model thus obtained is described in the journal "The Journal of American Society", 1951, 73, 373 written by E. P. Barrett, L. G. Joyner and P. P. Halenda. In the account which follows, the mesopore diameter $\phi$ of the given mesostructured matrix corresponds to the mean diameter on nitrogen adsorption defined as being a diameter at which the value of the derivative of the absorbed volume as a function of the pore size is maximal.

The materials with a high specific surface area according to the invention, which are in the form of spherical and non-aggregated particles, have a size which depends on the geometry of the sprayer used, and notably of the spraying nozzle. Preferentially, the materials with a high specific surface area obtained have a size ranging from 0.3 μm to 100 μm, notably from 1 μm to 50 μm with a size distribution centered on about 5 μm.

Determination of the size of the materials with a high specific surface area may be performed by transmission electron microscopy (TEM) or by scanning electron microscopy (SEM). These techniques allow the formation of an image of the studied solid, the contrasts observed being characteristic of the structural organization, of the texture or of the morphology of the particles observed, the resolution of the technique reaching a maximum of 0.2 nm. Alternatively, determination of the size of the materials with a high specific surface area may be performed by laser particle size analysis.

Transmission electron microscopy (TEM) also makes it possible to define the type of porosity of said materials. Observation of the materials according to the invention thus makes it possible to identify porosity of vermiform or cylindrical type, or spherical cavities. The mesopores have a size ranging from 2 nm to 50 nm, preferably from 2 nm to 30 nm and more preferably from 2 nm to 10 nm. The materials with a high specific surface area according to the present invention may thus be termed as mesoporous.

Advantageously, the material with a high specific surface area according to the invention comprises a mass fraction of solids derived from the clinker leachates of between 10% and 80%, and preferably between 20% and 65%.

Finally, a third subject of the invention relates to the use of a material with a high specific surface area, as obtained according to the process of the invention or as defined previously, as an adsorption support for pollutant species.

The materials with a high specific surface area of the present invention or obtained according to the process of the invention prove to be very good adsorbents when they are used for the adsorption of pollutants species notably contained in industrial chimney fumes. A subject of the present invention is thus also the use of a mesostructured material according to the invention as an adsorbent or as molecular sieves for separation.

The invention will be understood more clearly with the aid of the examples that follow, which illustrate the present patent application.

EXAMPLES

Example 1

Production of the Liquid Residues Derived from a Chemical Extraction of Clinker

The clinker leachate is obtained from 1 kg of dried and ground clinker screened to less than 100 μm, to which are added, in a fume cupboard, 1.18 kg of hydrochloric acid at 37% by mass, portionwise so as to limit the exothermic reaction.

Once the hydrochloric acid addition is complete (the change from a pasty state to a liquid state is very rapid; on obtaining the liquid state the exothermic reaction stops), 2 kg of mains water are added with stirring for 10 minutes. This addition makes it possible notably to make the preparation filterable. The mixture is then filtered through a funnel with filter paper of 10 μm porosity.

Example 2

Manufacture a Material with a High Specific Surface Area

Several mesostructured materials with a high specific surface area were manufactured according to the process of the invention from liquid residues derived from a chemical extraction of clinker and by varying the nature of the structuring agent(s) and of the precursor and the amount of structuring agent(s).

For each of the manufactures, the spraying is performed with a Büchi® B-290 spray-dryer and the particles have a diameter of between 0.5 and 10 μm (diameter determined by scanning electron microscopy).

a) Mesostructured material with a micron-sized high specific surface area based on leachate from the washing of clinker, TEOS and Brij® 58 (molar composition: 1 leachate dry extract: 1 TEOS: 0.12 Brij® 58).

The following compounds are added in order and with magnetic stirring (500 revolutions·min$^{-1}$) to a 500 mL beaker: 25 mL of leachate from the washing of clinker with HCl (37% by mass), 200 mL of osmosed water and 20.49 g of Brij® 58.

The solution is then stirred at 60° C. until the Brij® 58 has fully dissolved. After dissolution of the surfactant and cooling of the solution to 25° C., 31.62 g of tetraethoxysilane (TEOS) are added to the solution dropwise using a Pasteur pipette.

The solution is then stirred at 25° C. for 1 to 2 hours until a clear solution is obtained.

The solution is then sprayed as micrometer-sized droplets in a stream of hot gas (air) using a mono-nozzle with an aperture diameter of 0.7 mm.

The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 450° C. in an oven (ramp of 3° C./min and steady stage of 2 hours at 450° C.).

The material obtained is in powder form and has a BET specific surface area of 505 m$^2$/g.

b) Mesostructured material with a micron-sized high specific surface area based on leachate from the washing of clinker, TEOS and Brij® 58 (molar composition: 1 leachate dry extract: 1 TEOS: 0.20 Brij® 58).

The following compounds are added in order and with magnetic stirring (500 revolutions·min$^{-1}$) to a 500 mL beaker: 25 mL of leachate from the washing of clinker with HCl (37% by mass), 200 mL of osmosed water and 34.15 g of Brij® 58.

The solution is then stirred at 60° C. until the Brij® 58 has fully dissolved. After dissolution of the surfactant and cooling of the solution to 25° C., 31.62 g of tetraethoxysilane (TEOS) are added to the solution dropwise using a Pasteur pipette.

The solution is then stirred at 25° C. for 1 to 2 hours until a clear solution is obtained.

The solution is then sprayed as micrometer-sized droplets in a stream of hot gas (air) using a mono-nozzle with an aperture diameter of 0.7 mm.

The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C. The particles thus synthesized and recovered in the recovery tank are then hermetically stored in a polypropylene flask at room temperature, to be subsequently calcined at 450° C. in an oven (ramp of 3° C./min and steady stage of 2 hours at 450° C.).

The material obtained is in powder form and has a BET specific surface area of 410 m$^2$/g.

c) Mesostructured material with a micron-sized high specific surface area based on leachate from the washing of clinker, TEOS, MTEOS and Brij® 58 (molar composition: 1 leachate dry extract: 0.95 TEOS: 0.05 MTEOS: 0.12 Brij® 58).

The following compounds are added in order and with magnetic stirring (500 revolutions·min$^{-1}$) to a 500 mL beaker: 40 mL of leachate from the washing of clinker with HCl (37% by mass), 100 mL of osmosed water and 24.14 g of Brij® 58.

The solution is then stirred at 60° C. until the Brij® 58 has fully dissolved. After dissolution of the surfactant and cooling of the solution to 25° C., 29.99 g of tetraethoxysilane (TEOS) and 0.64 g of methyltriethoxysilane (MTEOS) are added to the solution dropwise using a Pasteur pipette.

The solution is then stirred at 25° C. for 1 to 2 hours until a clear solution is obtained. The solution is then sprayed as micrometer-sized droplets in a stream of hot gas (air) using a mono-nozzle with an aperture diameter of 0.7 mm.

The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h.

The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 350° C. in an oven (ramp of 3° C./min and steady stage of 2 hours at 350° C.).

The material obtained is in powder form and has a BET specific surface area of 440 m$^2$/g.

d) Mesostructured material with a micron-sized high specific surface area based on leachate from the washing of clinker, SiCl$_4$ produced and Brij® 58 (molar composition: 1 leachate dry extract: 1 SiCl$_4$: 0.12 Brij® 58).

The following compounds are added in order and with magnetic stirring (500 revolutions·min$^{-1}$) to a 300 mL beaker: 12.5 mL of leachate from the washing of clinker with HCl (37% by mass), 100 mL of osmosed water and 10.24 g of Brij® 58.

The solution is then stirred at 60° C. until the Brij® 58 has fully dissolved.

In a second 500 mL beaker, 12.9 g of SiCl$_4$ stored at 4° C. are added dropwise to 22.15 mL of absolute ethanol stored at 4° C. Since the reaction is exothermic and highly reactive, this mixing takes place in an ice bath with vigorous stirring (1000 revolutions·min$^{-1}$).

After dissolution of the surfactant and cooling of the leachate/Brij 58 solution to 25° C., this solution is added to the SiCl$_4$/ethanol solution dropwise using a Pasteur pipette and with vigorous stirring (1000-1200 revolutions·min$^{-1}$).

The solution obtained is then stirred at 25° C. for 1 to 2 hours until a clear solution is obtained, and is then sprayed as micrometer-sized droplets in a stream of hot gas (air) using a mono-nozzle with an aperture diameter of 0.7 mm.

The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 450° C. in an oven (ramp of 3° C./min and steady stage of 2 hours at 450° C.). The material obtained is in powder form and has a BET specific surface area of 560 m$^2$/g.

e) Mesostructured material with a micron-sized high specific surface area based on leachate from the washing of clinker, SiCl$_4$, MTEOS and Brij® 58 (molar composition: 1 leachate dry extract: 0.95 SiCl$_4$: 0.05 MTEOS: 0.12 Brij® 58).

The following compounds are added in order and with magnetic stirring (500 revolutions·min$^{-1}$) to a 200 mL beaker: 12.5 mL of leachate from the washing of clinker with HCl (37% by mass), 100 mL of osmosed water and 10.24 g of Brij® 58.

The solution is then stirred at 60° C. until the Brij® 58 has fully dissolved.

In a second 500 mL beaker, 12.27 g of SiCl$_4$ stored at 4° C. are added dropwise (Pasteur pipette) to 21.04 mL of absolute ethanol stored at 4° C. Since the reaction is exothermic and highly reactive, this mixing takes place in an ice bath with vigorous stirring (1000 revolutions·min$^{-1}$). The 0.51 g of methyltriethoxysilane (MTEOS) is added dropwise (Pasteur pipette) to the SiCl$_4$/ethanol solution.

After dissolution of the surfactant and cooling of the leachate/Brij® 58 solution to 25° C., this solution is added to the SiCl$_4$/ethanol/MTEOS solution dropwise using a Pasteur pipette and with vigorous stirring (1000-1200 revolutions·min$^{-1}$).

The solution obtained is then stirred at 25° C. for 1 to 2 hours until a clear solution is obtained. The solution is then sprayed as micrometer-sized droplets in a stream of hot gas (air) using a mono-nozzle with an aperture diameter of 0.7 mm. The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 350° C. in an oven (ramp of 3° C./min and steady stage of 2 hours at 350° C.). The material obtained is in powder form and has a BET specific surface area of 620 m$^2$/g.

f) Mesostructured material with a micron-sized high specific surface area based on leachate from the washing of clinker, SiCl$_4$, MTEOS and Brij® 58 (molar composition: 1 leachate dry extract: 0.85 SiCl$_4$: 0.15 MTEOS: 0.12 Brij® 58).

The following compounds are added in order and with magnetic stirring (500 revolutions·min$^{-1}$) to a 200 mL beaker: 12.5 mL of leachate from the washing of clinker with HCl (37% by mass), 100 mL of osmosed water and 10.24 g of Brij® 58. The solution is then stirred at 60° C. until the Brij® 58 has fully dissolved.

In a second 500 mL beaker, 11.63 g of SiCl$_4$ stored at 4° C. are added dropwise (Pasteur pipette) to 20.26 mL of absolute ethanol stored at 4° C. Since the reaction is exothermic and highly reactive, this mixing takes place in an ice bath with vigorous stirring (1000 revolutions·min$^{-1}$). The 1.03 g of methyltriethoxysilane (MTEOS) are added dropwise (Pasteur pipette) to the SiCl$_4$/ethanol solution.

After dissolution of the surfactant and cooling of the leachate/Brij® 58 solution to 25° C., this solution is added to the SiCl$_4$/ethanol/MTEOS solution dropwise using a Pasteur pipette and with vigorous stirring (1000-1200 revolutions·min$^{-1}$).

The solution obtained is then stirred at 25° C. for 1 to 2 hours until a clear solution is obtained. The solution is then sprayed as micrometer-sized droplets in a stream of hot gas (air) using a mono-nozzle with an aperture diameter of 0.7 mm. The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 350° C. in an oven (ramp of 3° C./min and steady stage of 2 hours at 350° C.). The material obtained is in powder form and has a BET specific surface area of 625 m$^2$/g.

g) Mesostructured material with a micron-sized high specific surface area based on leachate from the washing of clinker, SiCl$_4$, PTEOS and Brij® 58 (molar composition: 1 leachate dry extract: 0.95 SiCl$_4$: 0.05 PTEOS: 0.12 Brij® 58).

The following compounds are added in order and with magnetic stirring (500 revolutions·min$^{-1}$) to a 200 mL beaker: 12.5 mL of leachate from the washing of clinker with HCl (37% by mass), 100 mL of osmosed water and 10.24 g of Brij® 58. The solution is then stirred at 60° C. until the Brij® 58 has fully dissolved.

In a second 500 mL beaker, 12.27 g of SiCl$_4$ stored at 4° C. are added dropwise (Pasteur pipette) to 21.04 mL of absolute ethanol stored at 4° C. Since the reaction is exothermic and highly reactive, this mixing takes place in an ice bath with vigorous stirring (1000 revolutions·min$^{-1}$). The 0.91 g of phenyltriethoxysilane (PTEOS) is added dropwise (Pasteur pipette) to the SiCl$_4$/ethanol solution.

After dissolution of the surfactant and cooling of the leachate/Brij® 58 solution to 25° C., this solution is added to the SiCl$_4$/ethanol/PTEOS solution dropwise using a Pasteur pipette and with vigorous stirring (1000-1200 revolutions·min$^{-1}$).

The solution obtained is then stirred at 25° C. for 1 to 2 hours until a clear solution is obtained. The solution is then sprayed as micrometer-sized droplets in a stream of hot gas (air) using a mono-nozzle with an aperture diameter of 0.7 mm. The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 350° C. in an oven (ramp of 3° C./min and steady stage of 2 hours at 350° C.). The material obtained is in powder form and has a BET specific surface area of 695 m$^2$/g.

h) Mesostructured material with a micron-sized high specific surface area based on leachate from the washing of clinker, SiCl$_4$, APTES and Brij® 58 (molar composition: 1 leachate dry extract: 0.95 SiCl$_4$: 0.05 APTES: 0.12 Brij® 58).

The following compounds are added in order and with magnetic stirring (500 revolutions·min$^{-1}$) to a 200 mL beaker: 12.5 mL of leachate from the washing of clinker with HCl (37% by mass), 100 mL of osmosed water and 10.25 g of Brij® 58. The solution is then stirred at 60° C. until the Brij® 58 has fully dissolved.

In a second 500 mL beaker, 12.27 g of SiCl$_4$ stored at 4° C. are added dropwise (Pasteur pipette) to 21.04 mL of absolute ethanol stored at 4° C. Since the reaction is exothermic and highly reactive, this mixing takes place in an ice bath with vigorous stirring (1000 revolutions·min$^{-1}$). The 0.84 g of aminopropyltriethoxysilane (APTES) is added dropwise (Pasteur pipette) to the SiCl$_4$/ethanol solution. After dissolution of the surfactant and cooling of the leachate/Brij® 58 solution to 25° C., this solution is added to the SiCl$_4$/ethanol/APTES solution dropwise using a Pasteur pipette and with vigorous stirring (1000-1200 revolutions·min$^{-1}$).

The solution obtained is then stirred at 25° C. for 1 to 2 hours until a clear solution is obtained. The solution is then sprayed as micrometer-sized droplets in a stream of hot gas (air) using a mono-nozzle with an aperture diameter of 0.7 mm. The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 350° C. in an oven (ramp of 3° C./min and steady stage of 2 hours at 350° C.). The material obtained is in powder form and has a BET specific surface area of 410 m$^2$/g.

i) Mesostructured material with a micron-sized high specific surface area based on leachate from the washing of clinker, TEOS and CTAB (molar composition: 1 leachate dry extract: 1 TEOS: 0.28 CTAB).

The following compounds are added in order and with magnetic stirring (500 revolutions·min$^{-1}$) to a 500 mL beaker: 25 mL of leachate from the washing of clinker with HCl (37% by mass), 200 mL of osmosed water and 15.49 g of CTAB. The solution is then stirred until the CTAB has fully dissolved.

After dissolution of the surfactant, 31.62 g of tetraethoxysilane (TEOS) are added to the solution dropwise using a Pasteur pipette. The solution is then stirred at 25° C. for 1 to 2 hours until a clear solution is obtained.

The solution is then sprayed as micrometer-sized droplets in a stream of hot gas (air) using a mono-nozzle with an aperture diameter of 0.7 mm. The circulation flow rate of the solution was set at 0.36 L·h$^{-1}$. The flow rate of compressed air for the spraying was set at 670 L·h$^{-1}$. The circulation of air for the suction of the sprayed droplets was set at 34 m$^3$/h. The nominal sprayer inlet temperature was set at 170-180° C. so that the outlet temperature observed was about 90° C.

The particles thus synthesized and recovered in the recovery tank are then hermetically stored in a polypropylene flask at room temperature, to be subsequently calcined at 450° C. in an oven (ramp of 3° C./min and steady stage of 2 hours at 450° C.). The material obtained is in powder form and has a BET specific surface area of 485 m$^2$/g.

The invention claimed is:

1. A process for manufacturing a material with a BET specific surface area of at least 200 m$^2$.g$^{-1}$, and comprising mesopores having a size, determined by transmission electron microscopy, ranging from 2 nm to 50 nm, the process comprising a step of spraying of a liquid composition based on liquid residues derived from a chemical extraction of clinker wherein the liquid composition based on liquid residues derived from the chemical extraction of clinker comprises a structuring agent and a precursor, and, wherein the mole ratio between the structuring agent and the precursor ranges from 0.002 to 0.5.

2. The manufacturing process as claimed in claim 1, comprising a preliminary step of preparing said liquid composition.

3. The manufacturing process as claimed in claim 2, wherein the composition is prepared by mixing the liquid residues derived from a chemical extraction of clinker and the structuring agent.

4. The manufacturing process as claimed in claim 3, wherein the liquid residues derived from a chemical extraction of clinker are obtained by solid/liquid extraction of clinker.

5. The manufacturing process as claimed in claim 4, wherein the solid/liquid extraction is performed with an acidic and/or oxidizing solution.

6. The manufacturing process as claimed in claim 5, wherein the acidic and/or oxidizing solution is at least one of a hydrochloric acid (HCl), sulfuric acid (H$_2$SO$_4$), hydrofluoric acid (HF), sodium oxide (Na$_2$O) or potassium oxide (K$_2$O) solution.

7. The manufacturing process as claimed in claim 3, wherein the structuring agent is at least one of surfactants, polymers, cellulose-based compounds, and mineral salts.

8. The manufacturing process as claimed in claim 3, wherein the precursor is at least one of silicic acid, silicon alkoxides, silicate, colloidal silica, and silicon tetrachloride.

9. The manufacturing process as claimed in claim 3, comprising, after said spraying step, a step of removing the structuring agent.

10. The manufacturing process as claimed in claim 9, wherein the step of removing the structuring agent is a calcination step.

11. The manufacturing process as claimed in claim 10, wherein the calcination is performed at a temperature of from 400° C. to 600° C.

12. The manufacturing process as claimed in claim 10, wherein the calcination step is performed for a time of 1 hour to 3 hours.

13. The manufacturing process as claimed in claim 10, wherein it also comprises, after said calcination step, a step of washing and drying.

* * * * *